United States Patent
Han et al.

(10) Patent No.: US 9,716,813 B2
(45) Date of Patent: Jul. 25, 2017

(54) AERIAL SURVEY PLANE HAVING COVER FOR PROTECTING LENS OF INFRARED CAMERA FOR AERIAL SURVEY

(71) Applicant: KOREA INSTITUTE OF GEOSCIENCE AND MINERAL RESOURCES, Daejeon (KR)

(72) Inventors: Jong-Gyu Han, Daejeon (KR); Ki-Sung Sung, Incheon (KR); Sung-Soon Lee, Daejeon (KR); Yeong-Kwang Yeon, Daejeon (KR); Jeong-Chan Kim, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 234 days.

(21) Appl. No.: 14/565,252

(22) Filed: Dec. 9, 2014

(65) Prior Publication Data
US 2015/0163381 A1 Jun. 11, 2015

(30) Foreign Application Priority Data
Dec. 10, 2013 (KR) .................. 10-2013-0153233

(51) Int. Cl.
*H04N 7/18* (2006.01)
*H04N 5/225* (2006.01)
(Continued)

(52) U.S. Cl.
CPC .......... *H04N 5/2252* (2013.01); *F16M 11/00* (2013.01); *H04N 5/33* (2013.01); *H04N 7/183* (2013.01)

(58) Field of Classification Search
CPC ........ F16M 11/00; H04N 5/2252; H04N 5/33; H04N 7/183
(Continued)

(56) References Cited

U.S. PATENT DOCUMENTS

| | | | |
|---|---|---|---|
| 4,835,559 A * | 5/1989 | Hattan .................. | G03B 19/10 396/146 |
| 5,426,476 A * | 6/1995 | Fussell .................. | B64D 47/08 348/E5.026 |

(Continued)

FOREIGN PATENT DOCUMENTS

| | | |
|---|---|---|
| KR | 10-0823346 | 4/2008 |
| KR | 10-2008-0042418 | 5/2008 |
| KR | 10-2011-0066401 | 6/2011 |

OTHER PUBLICATIONS

Xiao-Hong et al, UAV's automatic landing in all weather based on the cooperative object and computer vision, 2012.*

(Continued)

*Primary Examiner* — Shan Elahi
(74) *Attorney, Agent, or Firm* — Lewis Roca Rothgerber Christie LLP

(57) ABSTRACT

An aerial survey plane having a cover for protecting a lens of an infrared camera for an aerial survey according to an exemplary embodiment of the present invention includes: an aerial survey observation window; an aerial survey infrared camera; at least one shock absorbing part to absorb shock applied to the aerial survey infrared camera; at least one support vertically provided on the shock absorbing part; a lifting part to lift and lower the aerial survey infrared camera; a protective cover provided between the aerial survey infrared camera and the bottom surface of the fuselage of the aerial survey plane and having a size to cover the aerial survey observation window; at least one motor to move the protective cover toward any one direction; and a controller to remotely control the opening and the closing of the protective cover.

12 Claims, 7 Drawing Sheets

(51) Int. Cl.
*F16M 11/00* (2006.01)
*H04N 5/33* (2006.01)

(58) Field of Classification Search
USPC .......................................................... 348/144
See application file for complete search history.

(56) References Cited

U.S. PATENT DOCUMENTS

| | | | | |
|---|---|---|---|---|
| 6,023,061 | A * | 2/2000 | Bodkin | B64D 47/08 250/252.1 |
| 6,792,684 | B1 * | 9/2004 | Hyyppa | G01B 11/00 33/1 A |
| 2007/0025809 | A1 * | 2/2007 | Lee | B64F 1/06 403/119 |
| 2008/0260237 | A1 * | 10/2008 | Savolainen | G06K 9/0063 382/154 |
| 2009/0015674 | A1 * | 1/2009 | Alley | H04N 7/185 348/144 |
| 2009/0094079 | A1 * | 4/2009 | Linville | G01C 21/20 705/5 |
| 2010/0013927 | A1 * | 1/2010 | Nixon | G01C 11/06 348/144 |
| 2012/0069019 | A1 * | 3/2012 | Richards | G06T 7/0061 345/421 |
| 2012/0200703 | A1 * | 8/2012 | Nadir | G02B 27/644 348/144 |
| 2013/0248656 | A1 * | 9/2013 | Mohamadi | H04W 16/26 244/190 |
| 2014/0163772 | A1 * | 6/2014 | Vian | G05D 1/0094 701/2 |
| 2016/0078272 | A1 * | 3/2016 | Hammoud | G06K 9/6268 382/103 |

OTHER PUBLICATIONS

Yahyanejad et al, Lens Distortion Correction for Thermal Cameras to Improve Aerial Imaging with Small-Scale UAVs, 2011.*

* cited by examiner

AERIAL SURVEY PLANE HAVING COVER FOR PROTECTING LENS OF INFRARED CAMERA FOR AERIAL SURVEY

CROSS-REFERENCE TO RELATED APPLICATION

This application claims the benefit under 35 U.S.C. §119 of Korean Patent Application No. 10-2013-0153233 filed on Dec. 10, 2013 in the Korean Intellectual Property Office, the entirety of which disclosure is incorporated herein by reference.

BACKGROUND OF THE INVENTION

1) Field of the Invention

The present invention relates to an aerial survey plane having a cover for protecting a lens of an infrared camera for an aerial survey, and more particularly, to an aerial survey plane having a damage protecting cover for preventing a damage to a photographic lens of an infrared camera, which is used for an aerial survey, externally exposed from the aerial survey plane.

2) Background of Related Art

Aerial survey is a method of collecting geomatics or planimetric features of a remote area, and should be distinguished from satellite surveys because of its better resolution.

The aerial survey obtains an image of a target location or a target region with respect to various ranges such as a visible wave range, an infrared wave range and a radio wave range.

To this end, an opening or a protrusion of a predetermined size is formed on a predetermined area of a plane (including a fixed wing and a rotary wing), for example, a part of a fuselage to install various cameras to obtain desired images.

The most basic method of photographing is to externally expose a camera of the aerial survey plane (called "plane") to obtain the desired image, and because this method is very vulnerable to unpredictable situations such as vibrations or sudden shaking of the plane, this method is only used when the aerial survey is performed as a hobby.

For other methods, various supporters are installed on an external surface of the plane and the aerial survey camera is fixed to the supporter, but because of the variation of the center of gravity of the plane due to the uneven distribution of weight, controlling the plane may be more difficult.

Therefore, for a stable aerial survey, the aerial survey camera is installed at a center of a bottom part of the fuselage of the corresponding plane.

For a smooth operation of the aerial survey camera, an opening is preferably formed in the bottom part of the corresponding plane.

In addition, the lens unit of the aerial survey camera is preferably installed while facing the ground surface or the water surface through the opening.

In this case, because the aerial survey is performed at a high altitude instead of a low altitude to increase the efficiency of surveying a large area in a short period of time, a device for protecting the camera from cold air or sudden foreign materials is required when moving from the low altitude to the high altitude or vice versa.

In this case, in general, because the weather at low altitudes is bad, an outer surface, especially a lens surface of the aerial survey camera may be damaged because of the bad weather when ascending from the low altitude to the high altitude or descending from the high altitude to the low altitude.

In addition, the aerial survey is normally performed by flying back and forth along a predetermined track as if plowing in a farm, and because the turning radius is considerably large, the amount of time that the camera is exposed to the external atmosphere is also considerably long.

As described, the outer surface of the aerial survey camera may be damaged due to a locally bad weather even when the camera is exposed while the aerial survey plane is rotating.

Further, the outer surface of the aerial survey camera may be damaged by foreign materials such a sand from a runway when the plane takes-off or lands for the aerial survey. Therefore, a device for protecting the outer surface of the aerial survey camera of the plane is required.

For reference, although the aerial survey camera used in the aerial survey plane of the present invention employs an infrared camera, various cameras other than the infrared camera can also be used for the aerial survey, and aerial surveys may use the camera to photograph the ultraviolet wave range or a conventional optical camera to photograph the visible wave range. In this case, for example, a surface of the lens of an image collecting unit of the aerial survey camera is handled with caution such that scratches do not occur.

Hereinafter, a method of using the aerial survey infrared camera in the aerial survey plane according to the related art will be briefly described with reference to FIG. 1 to FIG. 3.

FIG. 1 is a bottom perspective view illustrating an example of the aerial survey plane having the aerial survey infrared camera, FIG. 2 is a schematic bottom view illustrating a bottom structure of the aerial survey plane illustrated in FIG. 1, and FIG. 3 is a side sectional view illustrating the aerial survey infrared camera installed in the aerial survey plane according to the related art.

According to FIG. 1, an aerial survey plane 100 of the related art mainly includes a main wing 110, a fuselage 120, a horizontal tail wing 160 and a vertical tail wing 170. An auxiliary support 115 may be further formed between the main wing 110 and the fuselage 120 to reinforce strength.

In addition, a flap, an aileron 112 and an elevator 162 to assist a flight may be further formed on the main wing 110 and the tail wing 160.

The aerial survey plane 100 essentially further includes a propeller 125 to provide power during flight, but a method of providing power during flight is not limited to the propeller 125.

On the bottom surface 130, which constitutes a lower surface of the fuselage 120, landing gears 150, 152 and 154 are formed to help the landing and the take-off of the aerial survey plane 100. On the landing gears 150, 152 and 154, as described above, landing gear covers 151, 153 and 155 may be further provided, respectively, to actively prevent scattering of various fragments from occurring during the landing and the take-off of the aerial survey plane 100.

In this case, damage to the lens surface of the aerial survey infrared camera, which is installed in the aerial survey plane 100, may be actively prevented.

In addition, as illustrated in FIG. 2, an aerial survey observation window 140, on which the aerial survey infrared camera (not illustrated) is mounted, having a predetermined size is provided on the bottom surface 130 of the aerial survey plane 100.

The size of the aerial survey observation window 140 is standardized with a large diameter of 19 inches (48.26 cm)

and a small diameter of 8 inches (20.32 cm). Therefore, there may be two types of covers to open and cover the aerial survey observation window 140.

Meanwhile, the aerial survey infrared camera (not illustrated) faces the ground surface or the water surface in the aerial survey observation window 140.

Even though the present invention describes that the aerial survey infrared camera (not illustrated) faces the ground surface or the water surface, the present invention is not limited thereto and the aerial survey infrared camera (not illustrated) may be disposed while facing an opposite direction of the ground surface or the water surface.

Meanwhile, according to FIG. 3, the aerial survey infrared camera 200 may be installed on a part of the fuselage 120, that is an opening formed on the bottom surface of the aerial survey plane 100.

In FIG. 3, a reference numeral 220 may be a lens externally exposed from the aerial survey infrared camera 200.

In addition, the aerial survey infrared camera 200 may be fixedly installed on the fuselage 120 through a supporting plate 240. In this case, shock absorbing units 250 and 260 having elasticity are preferably installed between the supporting plate 240 and the fuselage 120.

The shock absorbing units 250 and 260 preferably use a rubber material for elasticity, and more preferably use a synthetic rubber material by taking severe environments into consideration.

In addition, the supporting plate 240 and the shock absorbing units 250 and 260 are preferably fixed by bolts 252 and 262.

As illustrated in FIG. 3, because the lens 220 of the aerial survey infrared camera 200 is externally exposed, as described above, the outer surface of the lens may be damaged from various foreign materials.

As related arts, there is Korean Unexamined Patent Publication No. 10-2008-0042418 (Published on May 15, 2008, Apparatus for protecting camera of heavy machinery). The publication discloses a configuration for preventing a rear observation camera of the heavy machinery from damage by various fragments.

SUMMARY OF THE INVENTION

Therefore, the present invention has been made to solve the described problems, and an object of the present invention is to provide an aerial survey plane having a cover for protecting a lens of an infrared camera for an aerial survey, which may protect an external surface of the camera exposed to an exterior of the aerial survey plane from various external impacts.

In addition, another object of the present invention is to provide a protective cover which may protect the infrared camera for the aerial survey from thermal impact caused by external temperatures.

Objects of the present invention may not be limited to the above objects, and other objects will be clearly understandable to those of ordinary skill in the art from the disclosures provided below.

To solve the object described above, an aerial survey plane having a cover for protecting a lens of an infrared camera for an aerial survey according to an exemplary embodiment of the present invention includes: an aerial survey observation window provided on a bottom surface of a fuselage of an aerial survey plane and having a predetermined size; an aerial survey infrared camera disposed at the aerial survey observation window and facing a ground surface or a water surface; at least one shock absorbing part disposed on a lower part of the aerial survey infrared camera to absorb shock applied to the aerial survey infrared camera from the aerial survey plane; at least one support vertically provided on the shock absorbing part to support the aerial survey infrared camera while surrounding the aerial survey infrared camera; a lifting part to lift up and down the aerial survey infrared camera; a protective cover provided between the aerial survey infrared camera and the bottom surface of the fuselage of the aerial survey plane and having a size to cover the aerial survey observation window to close the aerial survey observation window before the aerial survey plane starts an aerial survey; at least one motor disposed on at least one side surface of the protective cover to move the protective cover in a predetermined direction so that the aerial survey observation window is opened to start the aerial survey and the aerial survey observation window is closed to protect the lens of the aerial survey infrared camera; and a controller to remotely control the opening and the closing of the protective cover.

In this case, the lifting part is preferably integrally formed with the support and has at least one of a screw type, a hydraulic type and an electronic type.

In addition, to reduce control time, the lifting part may be a lever type capable of lifting up and down the aerial survey infrared camera by one manipulation.

Further, the protective cover may include a hard plate.

In addition, the motor preferably includes a rotating gear part including a protruding part to move the protective cover in one direction, and the protective cover preferably includes a groove part having a predetermined pitch to engage with the protruding part of the gear unit.

Further, the groove part preferably includes at least one row of grooves formed on an upper part or a lower part of the protective cover.

Alternately, the groove part may be formed on at least one of side surfaces of the protective cover.

To solve the object described above, an aerial survey plane having a cover for protecting a lens of an infrared camera for an aerial survey according to another exemplary embodiment of the present invention includes: an aerial survey observation window provided on a bottom surface of a fuselage of an aerial survey plane and having a predetermined size; an aerial survey infrared camera disposed at the aerial survey observation window and facing a ground surface or a water surface; guide blocks disposed at a lower part of the aerial survey infrared camera interposing the aerial survey observation window therebetween and comprising a coupling part on an upper end thereof to be coupled to the aerial survey infrared camera; a guide groove formed in a longitudinal direction on side surfaces of the guide blocks facing each other; a protective cover inserted into the guide groove to move back and forth in the longitudinal direction; a wire fixedly installed on at least one of side ends of the protective cover; a first motor and a second motor disposed on both sides of the guide block, respectively, to wind the wire fixedly installed on the side end of the protective cover; and a controller to remotely control the opening and the closing of the protective cover.

In this case, an upper part of the guide block is preferably fixed to the aerial survey infrared camera through the coupling part and a lower part of the guide block more preferably includes a shock absorbing part to absorb a shock applied thereto.

In addition, preferably, the first motor winds the wire while the second motor applies a predetermined amount of tension to the wire fixedly coupled to the protective cover and the second motor to suppress a fluctuation of the protective cover when closing the aerial survey observation window, and the second motor winds the wire while the first motor applies a predetermined amount of tension to the wire fixedly coupled to the protective cover and the first motor to suppress the fluctuation of the protective cover when opening the protective cover.

Further, preferably, the protective cover is provided between the aerial survey infrared camera and the bottom surface of the fuselage of the aerial survey plane and has a size to cover the aerial survey observation window to close the aerial survey observation window before the aerial survey plane starts an aerial survey.

Details of other embodiments are included in the detailed description and the accompanying drawings.

Advantages and features of the present invention, and method for achieving thereof will be apparent with reference to the examples that follow. But, it should be understood that the present invention is not limited to the following embodiments and may be embodied in different ways, and that the embodiments are given to provide complete disclosure of the invention and to provide thorough understanding of the invention to those skilled in the art, and the scope of the invention is limited only by the accompanying claims and equivalents thereof.

In the following description, the same reference numerals will be assigned to the same elements, and sizes, positions and relationships of each element of the present invention may be exaggerated for clarity of description. In addition, when describing embodiments of the present invention, detailed descriptions of well-known functions and structures incorporated herein may be omitted when they make the subject matter of the present invention unclear.

According to an exemplary embodiment of the present invention, an externally exposed surface of an aerial survey infrared camera, which is externally exposed from the aerial survey plane, may be effectively protected from foreign materials or fragments by a cover for protecting a lens of an infrared camera for an aerial survey.

In addition, according to an exemplary embodiment related to an aerial survey plane having a cover for protecting a lens of an infrared camera for an aerial survey, a lens of the aerial survey infrared camera may be effectively protected from an external temperature of the aerial survey plane.

DETAILED DESCRIPTION OF THE INVENTION

Hereinafter, an embodiment of the present invention is described in detail with reference to the accompanying drawings.

Figure 1:
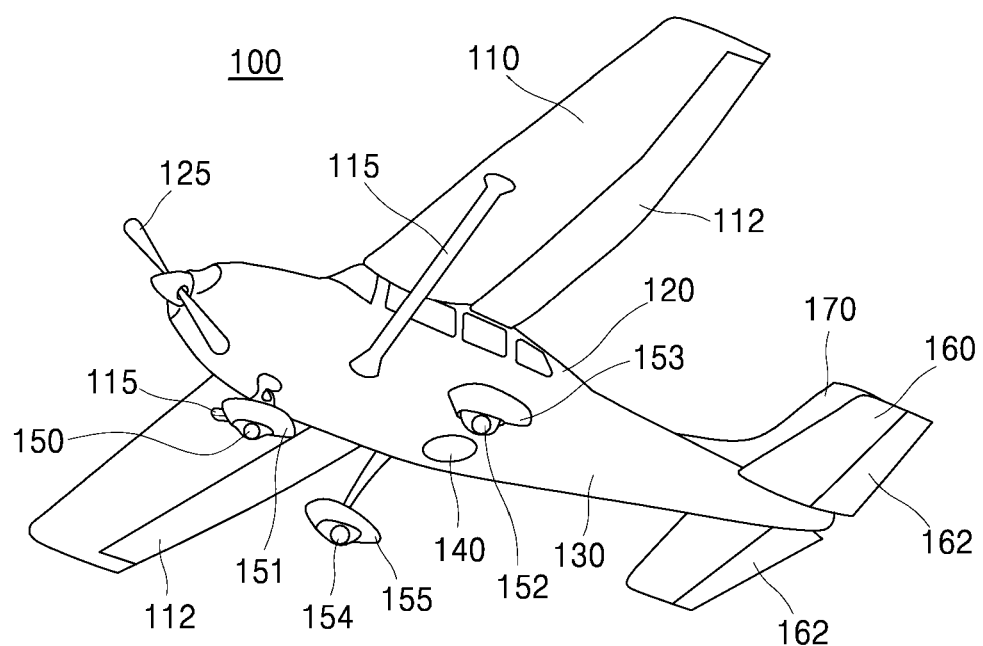
FIG. 1 is a bottom perspective view illustrating an example of an aerial survey plane having an aerial survey infrared camera.
Figure 2:
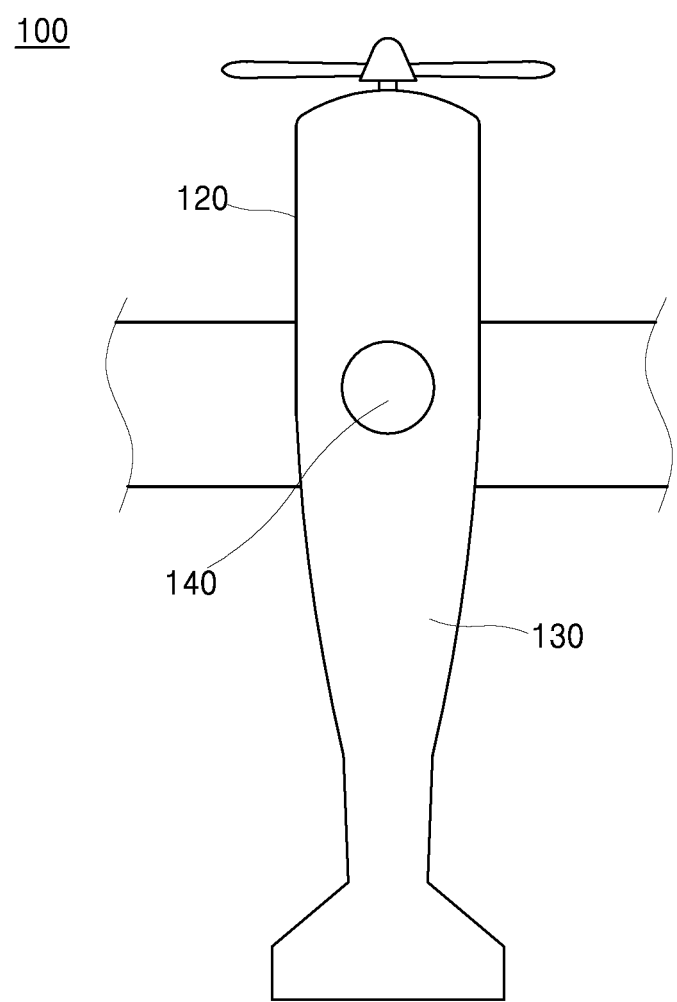
FIG. 2 is a schematic bottom view illustrating a bottom structure of the aerial survey plane illustrated in FIG. 1.
Figure 3:
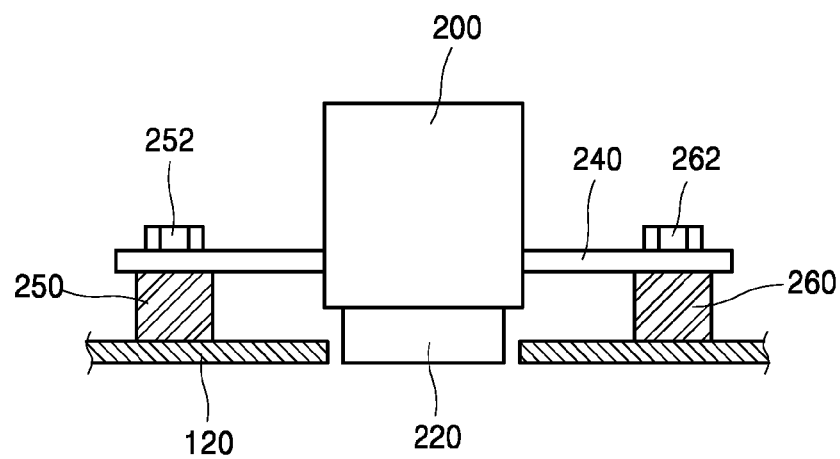
FIG. 3 is a side sectional view illustrating the aerial survey infrared camera installed in the aerial survey plane.
Figure 4:
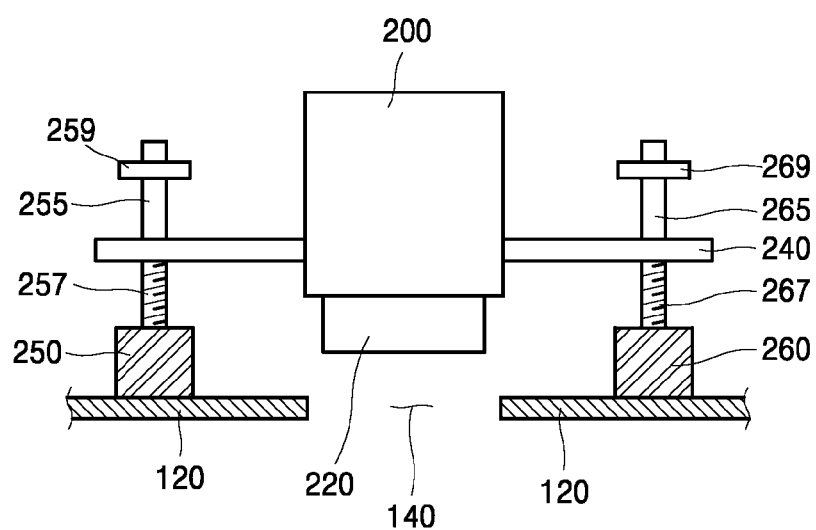
FIG. 4 is a side sectional view illustrating the aerial survey infrared camera illustrated in FIG. 3 having an altered height to describe an exemplary embodiment of the present invention.

FIG. 4 is a side sectional view illustrating an aerial survey infrared camera (hereinafter, referred to as "aerial survey camera") illustrated in FIG. 3 having an altered height to describe an exemplary embodiment of the present invention.

According to FIG. 4, the height of an aerial survey camera 200 fixedly installed in an aerial survey plane 100, and in this case, the aerial survey camera 200 is lifted up and down by lifting parts 257 and 267 formed on supports 255 and 265, respectively, which are vertically inserted on a supporting plate 240. In FIG. 4, the supports 255 and 265 are preferably formed vertical to shock absorbing units 250 and 260.

In FIG. 4, screw type lifting parts 257 and 267 are illustrated, and to move the aerial survey camera 200 up and down by the lifting parts 257 and 267, for example, control handles 259 and 269 may be rotated.

The lifting parts 257 and 267 illustrated in FIG. 4 may be formed as a hydraulic type or an electronic type instead of the screw type.

The hydraulic type or the electronic type may be remotely controlled through a controller (not illustrated).

When remotely controlling the lifting parts 257 and 267, as described above, passengers of the aerial survey plane can be protected from an outside cold, which may be tens of degree below zero at high altitudes.

A hydraulic actuator may be installed in the case of the hydraulic type, a linear motor or a linear actuator may be installed in the case of the electronic type.

In addition, the remote control may be performed by a wired or a wireless scheme. The lifting parts 257 and 267 formed on the supports 255 and 265 may vertically move up and down by the remote control in so that the aerial survey camera 200 may be moved up and down.

When the aerial survey camera 200 is moved up, an aerial survey observation window 140 is opened, and a cover (not illustrated, refer to FIG. 5) for protecting a lens of an aerial survey infrared camera according to an exemplary embodiment of the present invention may protect a lens 220 of the aerial survey plane 200 from external foreign materials.

That is, the aerial survey camera 200 performs an aerial survey in a lowered position as illustrated in FIG. 3 during the aerial survey, and when situations of concerns of external foreign materials arise such as during landing and take-off of the aerial survey plane, the lens protecting cover is moved to close the aerial survey observation window 140 so that the damage to a surface of the lens 220 of the aerial survey camera 200 is maximally prevented.

In this case, the lifting parts 257 and 267 may be formed in a lever type, in which the aerial survey camera is moved up or down by one manipulation thus reducing control time.

In the case of the screw type, taking into consideration that the time to rotate the control handles 259 and 269 formed on the lifting parts 257 and 267 takes a very long time, the advantage of time saving by the lever type is obvious.

In addition, the lever type is relatively free from failures or errors that may occur in the hydraulic or the electronic type.

Meanwhile, the lever type may preferably have a configuration of a lever installed on a lower part of the support plate 240 as in FIG. 4. When a lever type is used, the support plate 240 is preferably configured in such a manner that the camera does not fall due to the weight of the camera or an impact when the support plate 240 is moved up for safety reasons.

And at the same time, for a swift aerial survey, the support plate 240 is more preferably configured in such a manner that the support plate 240 moves down slowly so that, for example, impact to the aerial survey camera 200 by striking the shock absorbing part 250 and 260 with a powerful force may be avoided.

In addition, the lever may be installed on at least one position among a left side, a right side, a rear or a front of the drawing in FIG. 4, but when the weight of the aerial survey camera 200 is very heavy, the camera is preferably supported by levers at both sides of the camera.

In this case, a typical lever configuration may be used to move the support plate 240, on which the aerial survey camera 200 is fixed, and a detailed configuration is not described in detail.

Figure 5:
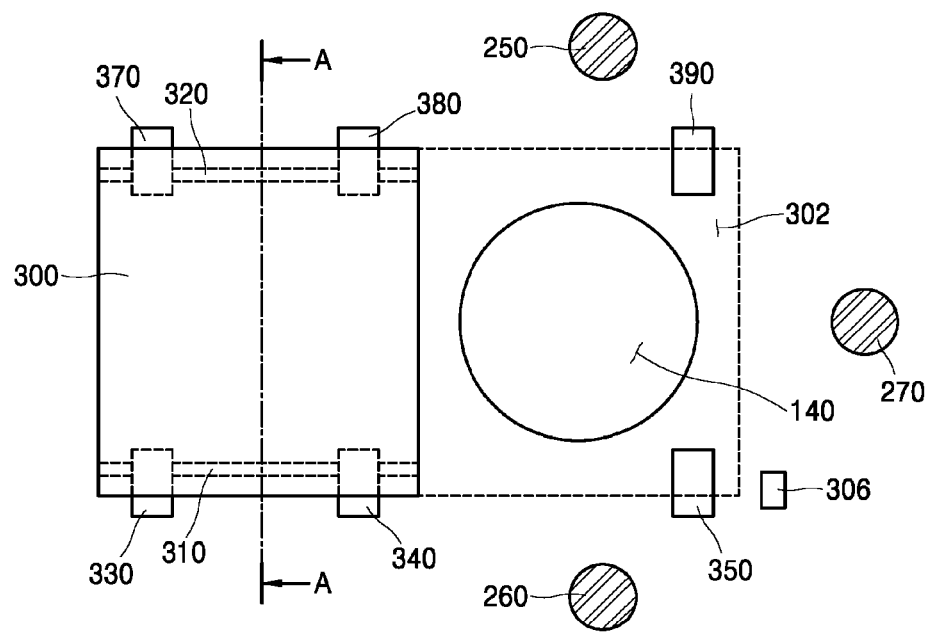
FIG. 5 is a plan view illustrating a hard plate type protective cover which is open to expose an aerial survey observation window according to an exemplary embodiment of the present invention.

FIG. 5 is a plan view illustrating hard plate type protective cover which is open to expose an aerial survey observation window according to an exemplary embodiment of the present invention.

According to FIG. 5, the shock absorbing parts 250, 260 and 270 having elasticity are provided at three positions. In a position where the shock absorbing parts 250, 260 and 270 are not provided, the hard plate type protective cover 300 is disposed to move left and right with reference to the drawing so that the aerial survey observation window 140 is exposed.

Preferably, the protective cover 300 is provided between the lens 220 of the aerial survey camera 200 and a bottom surface, which is a lower surface of the fuselage of the aerial survey plane 100 and has a size that may sufficiently cover the aerial survey observation window 140. In addition, the protective cover 300 more preferably closes the aerial survey observation window 140 before the aerial survey plane 100 starts the aerial survey.

The protective cover 300 is preferably formed in a hard plate having a predetermined thickness, and is more preferably formed in a metal plate to sufficiently protect the camera from large sized fragments.

In addition, the protective cover 300 is preferably adhered to a surface of the fuselage 120, if possible, to minimize the size of the opening of the aerial survey observation window 140.

In this case, the passengers can be more effectively protected from external thermal shock.

Not only the protective cover 300, but all protective covers described in the present invention are preferably adhered to the fuselage 120.

In addition, to assist the left and right movements of the protective cover 300, at least one motor 330, 340, 370 and 380 may be installed to each edge of a lower part of the protective cover 300.

In FIG. 5, reference numerals 350 and 390 indicates motors, which are engaged with a rightmost end of the moving protective cover 300 when the protective cover 300 starts moving right.

The protective cover 300 moves from left to right, and to guide this movement more smoothly, at least one guide groove 310 and 320 may be provided on an upper surface of the protective cover 300 in parallel to the movement direction of the protective cover 300.

A protrusion (not illustrated) may be provided on a lower part of the support plate 240 corresponding to the guide grooves 310 and 320.

A stable left and right movement of the protective cover 300 may be assured by the configuration of the guide grooves 310 and 320 and the protrusion.

Figure 10:
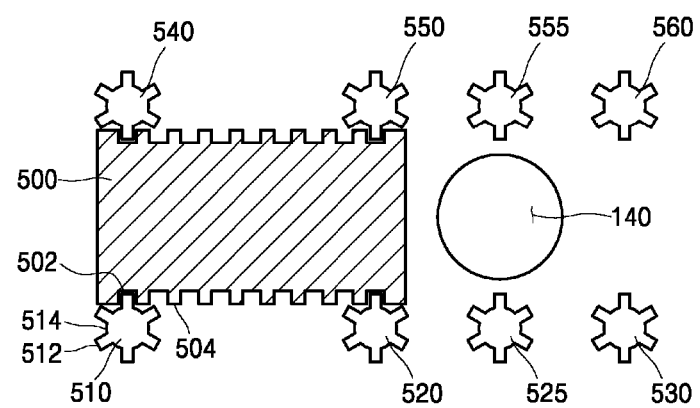
FIG. 10 is a plan view illustrating the hard plate type protective cover which is open to expose the aerial survey observation window according to another exemplary embodiment of the present invention illustrated in FIG. 5.
Figure 11:
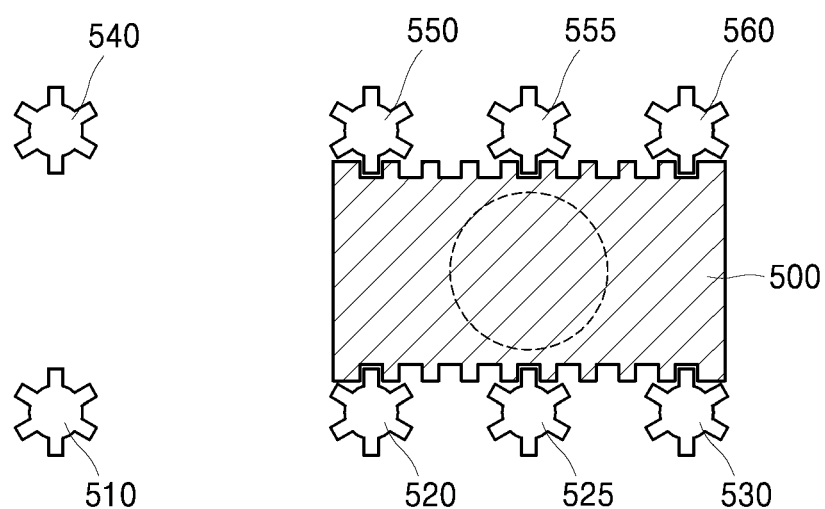
FIG. 11 is a plan view illustrating the protective cover which is closed to cover the aerial survey observation window according to another embodiment of the present invention illustrated in FIG. 5.

When the protective cover 300 starts moving, in addition to the guidance by the guide grooves 310 and 320, another motor (not illustrated, for example, an auxiliary motor 525 and/or 555 of FIG. 10 and FIG. 11) may be further provided between the motors 340 and 350 and the motors 380 and 390.

In this case, a more stable movement of the protective cover 300 may be assured.

In FIG. 4, a reference number 306 may be a controller to control the opening and closing of the protective cover 300.

In this case, the controller 306, as described above, may be configured to be remotely controllable to protect the passengers of the aerial survey plane from the external cold. The remote control may be operated by a wired or wireless communication, and in any case, is preferably doubly backed up for reliability. This is because a cost required for landing is enormous when a failure occurs after the aerial survey is started.

Meanwhile, to prevent an excessive left and right movement of the protective cover 300 and damage or dislocation from the excessive movement, the motors 330, 340, 370 and 380 may further include an apparatus for measuring a travel distance, for example a rotary encoder.

Alternately, a contact type and/or an optical type sensor (not illustrated), which may detect a completion of the movement of the protective cover 300, may be further provided at a leftmost side and/or a rightmost side of the protective cover 300 and/or on a movement path of the protective cover 300.

The movement of the protective cover 300 and the opening and closing of the aerial survey observation window 140 are described in more detail with reference to FIG. 6 and FIG. 7.

Figure 6:
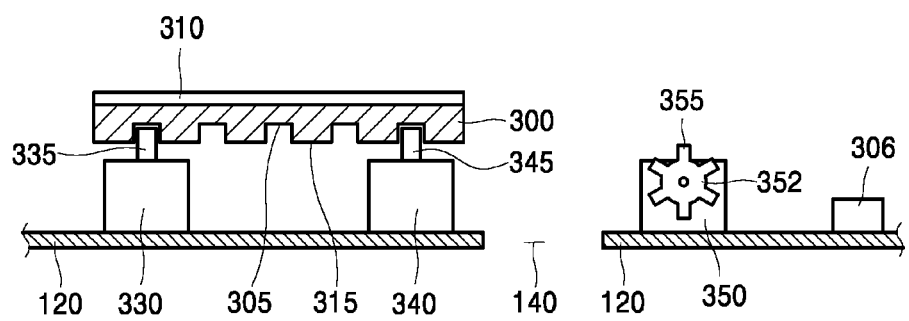
FIG. 6 is a first side sectional view illustrating a protective cover which is open to expose the aerial survey observation window according to an exemplary embodiment of the present invention.
Figure 7:
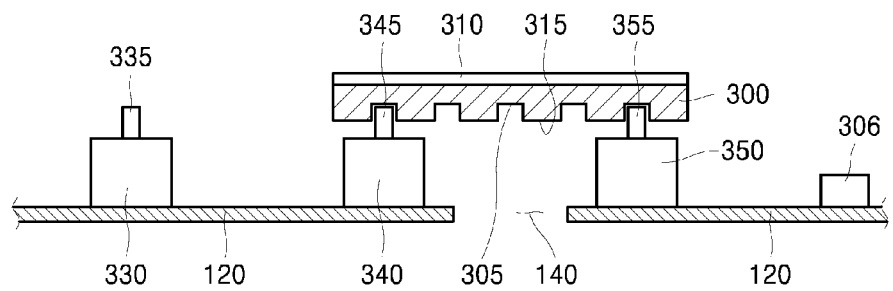
FIG. 7 is a second side sectional view illustrating a protective cover which is closed to cover the aerial survey observation window according to an exemplary embodiment of the present invention.

FIG. 6 is a first side sectional view illustrating the protective cover which is open to expose the aerial survey observation window according to an exemplary embodiment of the present invention and FIG. 7 is a second side sectional view illustrating the protective cover which is closed to cover the aerial survey observation window according to an exemplary embodiment of the present invention.

Various reference numerals in FIG. 6 and FIG. 7 are same as the reference numerals in FIG. 5, so descriptions of the same reference numerals are omitted.

In FIG. 6, protrusions 335 and 345 are formed on the motors 330 and 340 to engage with a gear part having a plurality of groove parts 305 and protrusion parts 315 in a constant interval on the protective cover 300.

The protrusions 225 and 245 may be used when moving the protective cover 300 to one direction.

Along with the protrusion parts 335 and 345, groove parts are also formed on the motors 330 and 340 but are not illustrated in the drawing.

The reason for adopting a gear part is because of the adverse condition inflicted to the aerial survey plane 100 while flying.

That is, not only a force pushing the aerial survey plane 100 backward by the movement of the aerial survey plane 100, but also a centrifugal force due to a turning of the plane, a vibration of the plane and various external disturbances may be inflicted to the aerial survey plane 100 while flying.

In addition, the plurality of grooves 305 and protrusions 315 formed on the protective cover 300, as illustrated in FIG. 5, are preferably formed in parallel to the guide grooves 310 and 320. In this case, the groove parts 305 and the protrusion parts 315 may be formed on one side surface of the protective cover 300, and more preferably formed on both sides for safety.

The protective cover 300 preferably includes groove parts 305 provided on at least one side surface of the protective cover 300 in a constant interval to engage with the protrusion part of the gear part.

In addition, the groove parts 305 of the protective cover 300 may have at least one row of the grooves formed on an upper part or a lower part of the protective cover 300.

When the groove parts 305 have at least one row, the protective cover 300 may move more safely.

Hereinafter, an interior structure of the motor 350 is described with reference to FIG. 6.

The motor 350 includes a rotating gear part 352 inside and one protrusion part 355 among a plurality of protrusion parts formed on the gear part 352 protrudes through to the outside of the motor 350.

The protrusion part 355 may engage with the groove parts 305 formed on the protective cover 300 when the protective cover 300 is moved to the right side of the drawing. Because of the engagement, a stable movement to the right side of the protective cover 300 may be assured.

An overall configuration of FIG. 7 is same as FIG. 6, and illustrates a closed state of the aerial survey observation window 140 after the protective cover 300 completed moving to the right side as in FIG. 6 so additional description is omitted.

The configuration of the gear part having the groove parts 305 and the protrusion parts 315 is used to move the protective cover 300 left and right in FIG. 5 to FIG. 7, but alternatively, a configuration using a chain may be used.

In this case, the chain may engage the groove parts 305 and the protrusion parts 315 formed on the protective cover 300 while passing through insides of the motors 330, 340 and 350 to form a caterpillar type configuration.

Hereinafter, the aerial survey plane having a cover for protecting a lens of infrared camera for an aerial survey according to another exemplary embodiment of the present invention is described with reference to FIG. 8 and FIG. 9.

Figure 8:
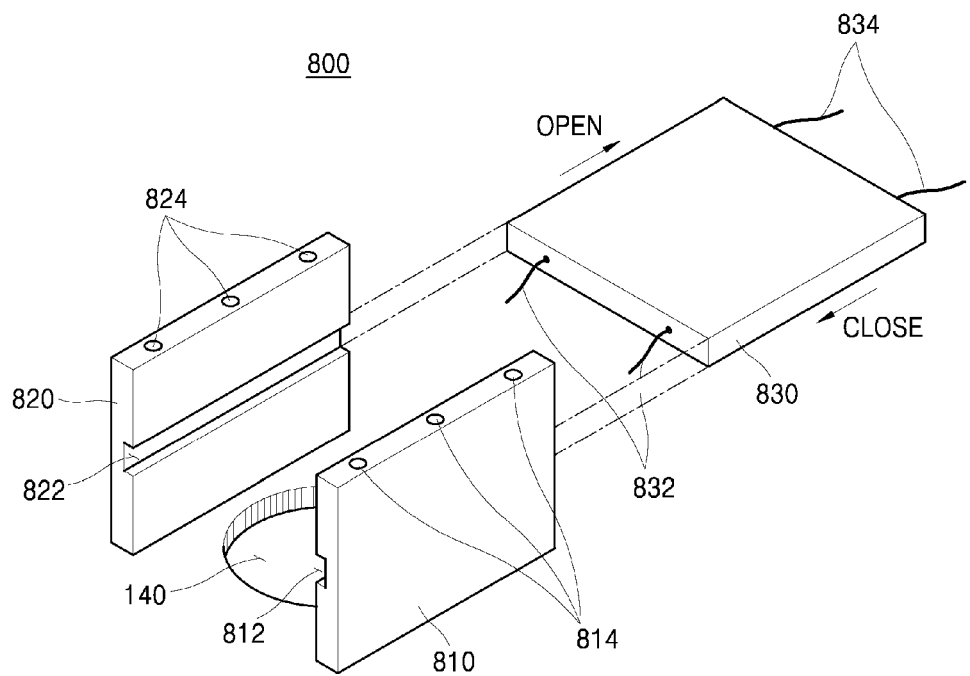
FIG. 8 is a perspective view illustrating an open state of an aerial survey observation window in the aerial survey plane having the cover for protecting the aerial survey infrared camera according to another exemplary embodiment of the present invention.
Figure 9:
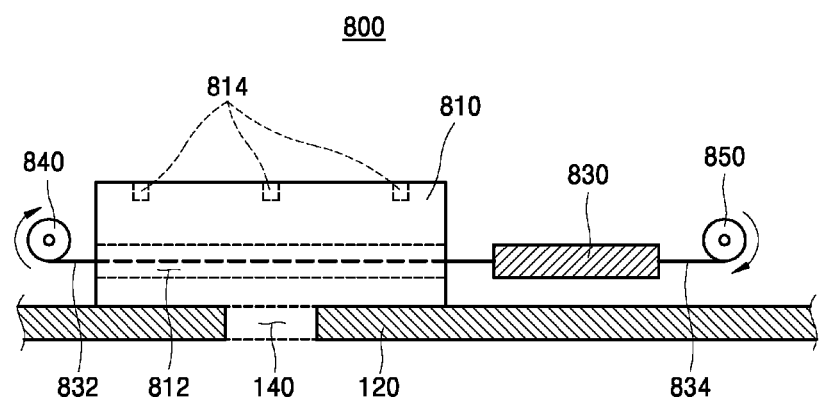
FIG. 9 is a side sectional view of the protective cover of the aerial survey plane having the cover for protecting the aerial survey infrared camera according to another exemplary embodiment of the present invention illustrated in FIG. 8.

FIG. 8 is a perspective view illustrating the open state of an aerial survey observation window in the aerial survey plane having a cover for protecting a lens of an infrared camera for an aerial survey according to another exemplary embodiment of the present invention, and FIG. 9 is a side sectional view of the protective cover of the aerial survey plane having a cover for protecting a lens of an infrared camera for an aerial survey according to another exemplary embodiment of the present invention illustrated in FIG. 8.

As illustrated in FIG. 8, the aerial survey plane 800 having a cover 830 for protecting a lens of an infrared camera (not illustrated) for an aerial survey according to another exemplary embodiment of the present invention includes the aerial survey observation window 140 opened in a predetermined size on the bottom surface of the fuselage 120 of an aerial survey plane 800.

In addition, the aerial survey infrared camera (not illustrated) is disposed on the upper part of the aerial survey observation window 140 and faces the ground surface or the water surface.

Guide blocks 810 and 820 are provided on the lower part of the aerial survey infrared camera (not illustrated), interposing the aerial survey observation window 140 therebetween and includes coupling parts 814 and 824 to be coupled to the infrared camera (not illustrated) for the aerial survey.

Three coupling parts 814 and 824 are illustrated for the coupling part in the drawing, but the number of coupling parts may increase or decrease according to needs.

Guide grooves 812 and 822 may be formed on side surfaces of the guide blocks 810 and 820 facing each other in a longitudinal direction.

In addition, the protective cover 830 may be inserted in the guide grooves 812 and 822 to move back and forth in the longitudinal direction.

In this case, preferably, the protective cover 830 is provided between the aerial survey infrared camera and the bottom surface of the fuselage 120 of the aerial survey plane 800 and has the size that may cover the aerial survey observation window 140.

In addition, the protective cover 830 preferably closes the aerial survey observation window 140 before the aerial survey plane 800 starts the aerial survey.

Meanwhile, wires 832 and 842 are fixed to at least one side end of the protective cover.

In this case, a first motor 840 and a second motor 850 may be provided to wind the wires 832 and 842, which are longitudinally disposed at both sides of the guide blocks 810 and 820 and fixed to the side end of the protective cover 830.

In addition, a controller (not illustrated) is preferably further included to remotely control the opening and closing of the protective cover 830.

A thickness of the protective cover 830 is preferably approximately same as a thickness of the guide grooves 812 and 822 formed on the guide blocks 810 and 820.

In addition, the aerial survey infrared camera (not illustrated) may be fixed through the coupling parts 814 and 824 on the guide blocks 810 and 820.

In this case, the coupling method is preferably a screw type coupling though a bolt and a nut for a simple coupling, but may be fixedly coupled by welding.

In this case, a shock absorbing part (not illustrated) may be further included to absorb an impact applied to a lower part of the guide blocks 810 and 820.

In addition, the shock absorbing part in this case preferably has a configuration similar to the shock absorbing parts 250 and 260 illustrated in FIG. 3.

Hereinafter, operations of the first motor 840 and the second motor 850 are briefly described.

When closing the aerial survey observation window 140 by the protective cover 830, the controller is driven so that the first motor 840 winds the wire 832.

In this case, the winding direction of the wire may be in a counter clockwise direction as illustrated in FIG. 9.

At the same time, the second motor 850 preferably applies a predetermined tension to the wire 834 fixedly coupled to the protective cover 830 and the second motor 850.

A fluctuation of the protective cover 830 may be suppressed by the tension.

Whereas, when opening the protective cover 830, the controller is driven so that the second motor 850 winds the wire 834.

In this case, the winding direction of the wire 834 may be in a clockwise direction instead of the counter clockwise direction illustrated in FIG. 9.

At the same time, the first motor 840 preferably applies a predetermined tension to the wire 832 fixedly coupled to the protective cover 830 and the first motor 840.

A fluctuation of the protective cover 830 may be actively suppressed by the tension.

Instead of the embodiments illustrated in FIG. 8 and FIG. 9, the gear part illustrated in FIG. 5 to FIG. 7 may be implemented at an inner part of the guide grooves instead the protective cover 830 being inserted in the guide grooves 812 and 822 to control the movement by the controller through the wires 832 and 842.

In this case, because complicated position control such as winding the wires 832 and 842 is not performed and the travel distance of the gear part may be easily determined, the position of the protective cover 830 may be accurately controlled.

In this case, a sensor unit (not illustrated) to detect an excessive winding of the protective cover 830 may be further provided.

The sensor unit may detect a travel distance of the wires 832 and/or 842 by measuring a number of rotations of the first motor 840 and the second motor 850.

Alternatively, the sensor unit may be a displacement meter to measure a relative displacement between the guide blocks 810 and/or 820 and the protective cover 830.

Further, the sensor unit may be a contact type or a non-contact type detection sensor to detect if the protective cover 830 is at a predetermined position.

In short, it is sufficient for the sensor unit if the sensor unit is able to control the opening and closing of the protective cover so that the protective cover 830 sufficiently closes and opens the aerial survey observation window 140.

Hereinafter, another embodiment of an exemplary embodiment of the present invention illustrated in FIG. 5 is described.

FIG. 10 is a plan view illustrating the opened hard plate type protective cover to expose the aerial survey observation window according to another exemplary embodiment of the present invention illustrated in FIG. 5 and FIG. 11 is a plan view illustrating the closed protective cover to cover the aerial survey observation window according to another embodiment of the present invention illustrated in FIG. 5.

FIG. 10 and FIG. 11, which are different from FIG. 5 in that the protective cover 500 moves in parallel to the fuselage 120 instead of moving vertical to the fuselage 120.

The elements such as a protective cover 500, groove parts 502 and protrusion parts 504 of the protective cover 500, motors 510, 520, 530, 540, 550 and 560) and groove parts 512 and protrusion parts 514 of the motor 510 corresponds with the elements of FIG. 5 to FIG. 7.

The elements of FIG. 5 to FIG. 7 are basically vertically installed and vertically operated, and the elements of FIG. 10 to FIG. 11 are basically transversely installed and transversely operated.

In addition, the guide grooves 310 and 320 may be also provided in FIG. 10 and FIG. 11.

FIG. 10 illustrates the opened aerial survey observation window 140, and in this case, typically, the groove parts 512 and the protrusion parts 514 of the motor 510 engage and rotate with the groove parts 502 and the protrusion parts 504 of the protective cover 500 so that the protective cover moves from left to right in the drawing.

The groove parts 502 and the protrusion parts 504 may be formed on at least one side surface with respect to the travel direction of the protective cover 500.

The movement of the protective cover 500 in FIG. 10 and FIG. 11 is identical to the movement of the protective cover in FIG. 5 to FIG. 7, so the description of the movement of the protective cover 500 is omitted.

The protective covers 300, 400 and 500 are preferably formed to make contact with the fuselage 120 instead of the illustrations in each drawing.

In addition, the protective covers 300, 400 and 500 are preferably opened and closed from the tail of the plane to the front of the plane, other than from the front of the plane to the tail of the plane, by taking into consideration the flight characteristic of the aerial survey plane 100.

If the aerial survey plane 100 is not a fixed wing plane as illustrated, the opening and closing direction of the protective covers 300, 400 and 500 may be relatively freely set.

In addition, the opening and closing of the protective covers 300, 400 and 500 may be remotely controlled, but may be automatically opened and closed without human control by using a geographical information assisting system such as a GPS when entering a predetermined track or altitude considering the characteristic of the aerial survey.

In addition, when using the GPS, the protective covers 300, 400 and 500 may be automatically opened when arriving at an aerial survey area and the protective covers 300, 400 and 500 may be automatically closed when the aerial survey is ended, that is deviating from the corresponding area.

In this case, tiredness from manually controlling the protective covers 300, 400 and 500 may be alleviated because a person does not need to open and close the protective covers 300, 400 and 500 by hand.

While the present invention has been particularly shown and described with reference to various embodiments thereof, it should not be interpreted in any way to limit the scope of the present invention, and it will be understood by those of ordinary skill in the art that various substitutions, changes in form and alterations may be made therein without departing from the spirit and the scope of the present invention. Therefore, the scope of the present invention is not limited to the described embodiments, but is limited only by the accompanying claims and equivalents thereof, and any alterations equivalent to the accompanying claims are within the scope of the present invention.

What is claimed is:

1. An aerial survey plane having a cover for protecting a lens of an infrared camera for an aerial survey, the plane comprising:

an aerial survey observation window provided on a bottom surface of a fuselage of an aerial survey plane and having a predetermined size;

an aerial survey infrared camera disposed at the aerial survey observation window and facing a ground surface or a water surface;

at least one shock absorbing part disposed on a lower part of the aerial survey infrared camera to absorb shock applied to the aerial survey infrared camera from the aerial survey plane;

at least one support vertically provided on the shock absorbing part to support the aerial survey infrared camera while surrounding the aerial survey infrared camera;

a lifting part to lift up and down the aerial survey infrared camera;

a protective cover provided between the aerial survey infrared camera and the bottom surface of the fuselage of the aerial survey plane and having a size to cover the aerial survey observation window to close the aerial survey observation window before the aerial survey plane starts an aerial survey;

at least one motor disposed on at least one side surface of the protective cover to move the protective cover in a predetermined direction so that the aerial survey observation window is opened to start the aerial survey and the aerial survey observation window is closed to protect the lens of the aerial survey infrared camera; and a controller to remotely control the opening and the closing of the protective cover.

2. The aerial survey plane according to claim 1, wherein the lifting part is integrally formed with the support and has at least one of a screw type, a hydraulic type and an electronic type.

3. The aerial survey plane according to claim 1, wherein the lifting part is a lever type capable of lifting up or down the aerial survey infrared camera by one manipulation.

4. The aerial survey plane according to claim 1, wherein the protective cover comprises a hard plate.

5. The aerial survey plane according to claim 4, wherein the motor comprises a rotating gear part comprising a protruding part to move the protective cover in one direction, and the protective cover comprises a groove part having a predetermined pitch to engage with the protruding part of the gear unit.

6. The aerial survey plane according to claim 5, wherein the groove part comprises at least one row of grooves formed on an upper part or a lower part of the protective cover.

7. The aerial survey plane according to claim 5, wherein the groove part is formed on at least one of side surfaces of the protective cover.

8. An aerial survey plane having a cover for protecting a lens of an infrared camera for an aerial survey, the plane comprising:

an aerial survey observation window provided on a bottom surface of a fuselage of an aerial survey plane and having a predetermined size;

an aerial survey infrared camera disposed at aerial survey observation window and facing a ground surface or a water surface;

guide blocks disposed at a lower part of the aerial survey infrared camera while interposing the aerial survey observation window therebetween and comprising a coupling part on an upper end thereof to be coupled to the aerial survey infrared camera;

a guide groove formed in a longitudinal direction on side surface of the guide blocks facing each other;

a protective cover inserted into the guide groove to move back and fourth in the longitudinal direction;

a wire fixedly installed on at least one of side ends of protective cover;

a first motor and a second motor disposed on both sides of the guide block, respectively, to wind the wire fixedly installed on the side end of the protective cover; and a controller to remotely control the opening and the closing of the protective cover.

9. The aerial survey plane according to claim 8, wherein an upper part of the guide block is fixed to the aerial survey infrared camera through the coupling part.

10. The aerial survey plane according to claim 8, wherein a lower part of the guide block further comprises a shock absorbing part to absorb a shock applied thereto.

11. The aerial survey plane according to claim 8, wherein the first motor winds the wire while the second motor applies a predetermined amount of tension to the wire fixedly coupled to the protective cover and the second motor to suppress a fluctuation of the protective cover when closing the aerial survey observation window, and the second motor winds the wire while the first motor applies a predetermined amount of tension to the wire fixedly coupled to the protective cover and the first motor to suppress the fluctuation of the protective cover when opening the protective cover.

12. The aerial survey plane according to claim 8, wherein the protective cover is provided between the aerial survey infrared camera and the bottom surface of the fuselage of the aerial survey plane and has a size to cover the aerial survey observation window to close the aerial survey observation window before the aerial plane starts an aerial survey.

* * * * *